(12) United States Patent
Grahl et al.

(10) Patent No.: US 7,919,552 B2
(45) Date of Patent: Apr. 5, 2011

(54) POLYURETHANE POWDER LACQUER

(75) Inventors: Michael Grahl, Leverkusen (DE); Hans-Josef Laas, Odenthal (DE); Dorota Greszta-Franz, Solingen (DE); Reinhard Halpaap, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 551 days.

(21) Appl. No.: 11/901,832

(22) Filed: Sep. 19, 2007

(65) Prior Publication Data

US 2008/0182928 A1 Jul. 31, 2008

(30) Foreign Application Priority Data

Sep. 23, 2006 (DE) .................. 10 2006 045 003

(51) Int. Cl.
*C08K 5/05* (2006.01)
(52) U.S. Cl. ................. 524/385; 524/589
(58) Field of Classification Search ........... 524/385, 524/589
See application file for complete search history.

(56) References Cited

U.S. PATENT DOCUMENTS

| | | | |
|---|---|---|---|
| 3,923,743 A | 12/1975 | Quiring et al. | 260/7.5 NT |
| 4,044,171 A | 8/1977 | Muller et al. | 427/27 |
| 4,413,079 A | 11/1983 | Disteldorf et al. | 524/169 |
| 4,426,329 A | 1/1984 | Woods et al. | 260/398.6 |
| 4,463,154 A | 7/1984 | Disteldorf et al. | 528/45 |
| 4,483,798 A | 11/1984 | Disteldorf et al. | 260/239 A |
| 4,801,680 A | 1/1989 | Geary et al. | 528/272 |
| 4,900,800 A | 2/1990 | Halpaap et al. | 528/66 |
| 5,596,066 A * | 1/1997 | Laas et al. | 528/73 |
| 5,614,323 A | 3/1997 | Chang | 428/425.8 |
| 5,621,064 A | 4/1997 | Laas et al. | 528/60 |
| 5,847,044 A | 12/1998 | Laas et al. | 524/590 |
| 6,297,343 B1 | 10/2001 | Laas et al. | 528/45 |
| 6,613,861 B2 | 9/2003 | Gras | 528/45 |
| 6,908,980 B2 | 6/2005 | Gras | 528/73 |
| 6,914,115 B2 | 7/2005 | Spyrou et al. | 528/45 |
| 6,916,897 B2 | 7/2005 | Gras | 528/73 |
| 6,987,158 B2 | 1/2006 | Laas et al. | 528/45 |
| 7,019,088 B1 | 3/2006 | Lehmann et al. | 525/460 |
| 7,098,289 B2 | 8/2006 | Laas et al. | 528/52 |
| 7,300,997 B2 | 11/2007 | Wenning et al. | |
| 2002/0095019 A1 | 7/2002 | Gras | 528/73 |
| 2003/0153713 A1 | 8/2003 | Spyrou et al. | 528/48 |
| 2003/0204040 A1 | 10/2003 | Gras | 528/44 |
| 2003/0208026 A1 | 11/2003 | Gras | 528/73 |
| 2004/0049028 A1 | 3/2004 | Laas et al. | 540/202 |
| 2004/0059082 A1 | 3/2004 | Laas et al. | 526/65 |
| 2004/0110918 A1 | 6/2004 | Laas et al. | 528/73 |
| 2004/0219367 A1 | 11/2004 | Spyrou et al. | 428/423.1 |
| 2005/0003206 A1 | 1/2005 | Spyrou et al. | 428/423.1 |
| 2005/0085615 A1 | 4/2005 | Wenning et al. | |
| 2005/0090636 A1 | 4/2005 | Wenning et al. | |
| 2005/0119437 A1 | 6/2005 | Wenning et al. | 528/44 |
| 2005/0222364 A1 | 10/2005 | Rawlins et al. | 528/45 |
| 2005/0239956 A1 | 10/2005 | Spyrou et al. | 524/589 |
| 2005/0239992 A1 | 10/2005 | Spyrou et al. | 528/44 |

FOREIGN PATENT DOCUMENTS

| | | |
|---|---|---|
| CA | 2115763 | 3/1993 |
| EP | 0669354 | 8/1995 |
| EP | 1443064 | 8/2004 |
| EP | 1526146 | 4/2005 |
| EP | 1526147 | 4/2005 |
| GB | 1 488 631 | 10/1977 |

\* cited by examiner

*Primary Examiner* — Edward J Cain
(74) *Attorney, Agent, or Firm* — Connolly Bove Lodge & Hutz LLP

(57) ABSTRACT

The present invention relates to polyurethane powder lacquers with optimized flow behavior, a process for their production, a process for coating substrates with these powder lacquers, as well as substrates coated with these powder lacquers.

17 Claims, No Drawings

POLYURETHANE POWDER LACQUER

CROSS-REFERENCE TO RELATED APPLICATION

The present application claims the right of priority under 35 U.S.C. §119 (a)-(d) of German Patent Application Number 10 2006 045 003.5, filed Sep. 23, 2006.

BACKGROUND OF THE INVENTION

Under the pressure of increasingly stricter environmental legislation, the development of powder lacquers, in addition to high-solids lacquers and aqueous coating systems, has become increasingly important in recent years. Powder lacquers do not release any harmful solvents during their application, can be processed with very high material efficiency and recovery, and are therefore regarded as particularly environmentally friendly and economical.

Extremely high-grade, light-resistant and weather-resistant coatings can be produced with heat-curable powder lacquers based on polyurethane. The polyurethane (PUR) powder lacquers currently established in the market generally consist of solid polyester polyols, which are hardened (cured) with solid blocked aliphatic or in most cases cycloaliphatic polyisocyanates. These systems have the disadvantage, however, that under thermal cross-linking the compounds used as blocking agents split off and largely escape. Accordingly, when they are processed, for apparatus reasons as well as for reasons of ecology and work safety special measures have to be taken to purify the waste air and/or to recover the blocking agent.

One possible way of preventing the emission of blocking agents is to use the known PUR powder lacquer cross-linking agents containing uretdione groups (e.g. DE-A-2 312 391, DE-A 2 420 475, EP-A 0 045 994, EP-A 0 045 996, EP-A 0 045 998, EP-A 0 639 598 or EP-A 0 669 353). In these products, the thermal reverse cleavage of uretdione groups into free isocyanate groups and their reaction with the hydroxyfunctional binding agent is used as the cross-linking principle. In practice uretdione powder lacquer cross-linking agents have, however, up to now been used only to a small extent. The reason for this is the comparatively low reactivity of the internally blocked isocyanate groups, which as a rule requires stoving temperatures of at least 160° C.

Although it is known that the cleavage of uretdione groups occurs noticeably starting at about 100° C., especially in the presence of reactants containing hydroxyl groups, the reaction still proceeds so slowly in this temperature range that unrealistically long times of several hours are required for the complete hardening of lacquer films for practical use. Although in DE-A 2 420 475, DE-A 2 502 934 or EP-A 0 639 598 temperatures starting from 110° C. are already given as possible stoving conditions for powder lacquer systems containing uretdione groups, and in DE-A 2 312 391 even temperatures starting from 90° C. are mentioned, the specifically described embodiments show sufficiently cross-linked coatings can be obtained under practical stoving times of at most 30 minutes only starting at temperatures of 150° to 160° C. These publications do not disclose how powder lacquers can be prepared that can actually be completely hardened to a commercially usable extent at temperatures below 150° C. to 160° C.

There has been no lack of attempts to accelerate the hardening of uretdione-cross-linked PUR powder lacquers by the combined use of suitable catalysts. Various compounds have been suggested for this purpose, for example, the organometallic catalysts known from polyurethane chemistry, such as tin(II) acetate, tin(II) octoate, tin(II) ethylcaproate, tin(II) laurate, dibutyltin diacetate, dibutyltin dilaurate, dibutyltin maleate, (e.g. EP-A 0 045 994, EP-A 0 045 998, EP-A 0 601 079, WO 91/07452 or DE-A 2 420 475), iron(III) chloride, zinc chloride, zinc-2-ethylcaproate and molybdenum glycolate, tertiary amines such as triethylamine, pyridine, methylpyridine, benzyldimethylamine, N,N-endoethylenepiperizine, N-methylpiperidine, pentamethyldiethylenetriamine, N,N'-dimethyl-piperazine (e.g. EP-A 0 639 598) or N,N,N'-trisubstituted amidines, in particular bicyclic amidines such as 1,5-diazabicyclo[4.3.0]non-5-ene(DBN) (e.g. EP-A 0 803 524).

Of these catalysts, the aforementioned bicyclic amidines allow the lowest stoving temperatures. At the same time, however, they lead to a stoving yellowing that is unacceptably high for many areas of application. For this reason amidine-catalysed uretdione systems have not been able to penetrate the market.

Recently further progress has been achieved in lowering the stoving temperature of uretdione powder lacquers.

According to the teaching of EP-A 1 137 689, Lewis acid catalysts, such as for example the aforementioned tin or zinc compounds, are inhibited by acidic groups, such as carboxyl groups. Their full catalytic activity can therefore be displayed in a uretdione powder lacquer system only if the employed hydroxyfunctional binder is free of carboxyl groups. For this reason a sufficient amount of an agent reactive with respect to carboxyl groups, for example an epoxide, is added to the powder lacquers described in this publication, which consist of conventional hydroxyfunctional binders, cross-linking agents containing uretdione groups and special Lewis acid catalysts, in order to convert as completely as possible any carboxyl groups possibly still present in the binder and thereby remove them from the system. In this way the reactivity of the polyurethane powders can in fact be increased to such an extent that the hardening already commences starting at a temperature of ca. 120° C., though the lacquer films obtained thereby exhibit a completely unsatisfactory flow behaviour, which is reflected in a marked surface structure and absence of gloss. Although improved lacquer formulations of this type are described in WO 2005/095482, which in the presence of zinc catalysts cross-link at low temperatures and provide coatings having an acceptable flow, these formulations involve the use of very special hydroxyl functional binders with an exactly defined residual content of acidic groups.

Further catalysts, with which, in the absence of carboxyl groups, and with the combined use of a compound reactive with respect to carboxyl groups, the stoving temperature of uretdione powder lacquers can similarly be significantly reduced, as with the Lewis acid catalysts of EP-A 1 137 689, are for example the ammonium hydroxides and fluorides described in EP-A 1 334 987, the ammonium carboxylates described in EP-A 1 475 399 or the metal hydroxides and alcoholates described in EP-A 1 475 400. However, these catalysts also lead to powder lacquers having a structured surface and insufficient gloss. Even by using special cross-linking agent components containing uretdione groups, which were produced with 1,12-dodecanediol as chain extender (see e.g. EP-A 1 524 283 and EP-A 1 526 147), and/or special partially crystalline polyester polyols as binder (see e.g. WO 2005/105879 and WO 2005/105880), the problem of the defective optical properties of highly reactive uretdione powder lacquers has not up to now been satisfactorily solved.

Accordingly, the object of the present invention was to provide new cleavage-free PUR powder lacquers based on readily accessible commercial binder components, which harden at low stoving temperatures and correspondingly short stoving times and at the same time produce completely cross-linked lacquer films, which compare to the hitherto known uretdione powder lacquers hardenable at low temperature, and are characterized by significantly improved surface properties, in particular an outstanding flow behavior.

This object was now achieved by providing the uretdione powder lacquers containing monoalcohols described in more detail hereinafter.

The present invention is based on the surprising observation that with cleavage-free PUR powder lacquers consisting of uretdione powder lacquer cross-linking agents, conventional hydroxyfunctional binders, suitable catalysts accelerating the reaction of uretdione groups with hydroxyl groups, and optionally an at least equimolar amount with respect to the carboxyl groups present in the system of a compound reactive to carboxyl groups, coatings having an outstanding flow behavior can already be obtained at temperatures from 110° C. if a defined amount of a solid monoalcohol or a monoalcohol mixture is additionally added to the powder lacquers. The coatings that are thereby obtained exhibit excellent mechanical properties and good solvent resistances, irrespective of the reduction in functionality of the binder caused by the addition of the monoalcohol.

SUMMARY OF THE INVENTION

The present invention provides a polyurethane powder lacquer containing
A) a binder component comprising one or more hydroxyfunctional compounds present in solid form below 40° C. and in liquid form above 130° C., with an OH number of 15 to 200 mg KOH/g, a number average molecular weight of 40 to 10,000 and a total content of carboxyl groups (calculated as COOH; molecular weight=45) of up to 2.0 wt. %,
B) one or more polyaddition compounds comprising uretdione groups and optionally free isocyanate groups and based on aliphatic and/or cycloaliphatic diisocyanates,
C) one or more monoalcohols present in solid form below 23° C. and in liquid form above 125° C.,
D) one or more curing catalysts suitable for accelerating the reaction of uretdione groups with hydroxyl groups,
E) optionally a component comprising one or more compounds with a number average molecular weight of 200 to 5000 and having groups reactive to carboxyl groups, and
F) optionally auxiliary substances and additives known from powder lacquer technology,
wherein the components A), B) and C) are present in such quantitative amounts that 0.8 to 2.2 isocyanate groups of the component B) are available for each hydroxyl group of the components A) and C), the components A) and optionally E) are present in such quantitative amounts that 0.8 to 2.0 groups of the component E) that are reactive to carboxyl groups are available for each carboxyl group of the component A), the proportion of the component C) in the total amount of the components A) to F) is from 1 to 10 wt. %, and the proportion of the component D) in the total amount of the components A) to F) is 0.05 to 5 wt. %.

DETAILED DESCRIPTION OF THE PREFERRED EMBODIMENTS

As used throughout this Specification, as well as in the Claims, the expression "isocyanate groups of the component B)" shall be understood to mean the sum of i) isocyanate groups present in dimeric form as uretdione groups and ii) free isocyanate groups.

The present invention also provides for the use of this powder lacquer for coating arbitrary heat-resistant substrates, i.e. those that do not undergo undesirable physical changes (mechanical properties) or geometrical changes (shape) at the stoving temperatures.

The powder lacquers according to the invention contain as component A) a hydroxyfunctional binder component that is present in solid form below 40° C. and in liquid form above 130° C. and which comprises at least one polymeric polyol.

In this connection the binders are arbitrary binders known from powder lacquer technology and containing hydroxyl groups, with an OH number of 15 to 200 mg KOH/g, preferably 25 to 150 mg KOH/g, which have a mean (calculable from the functionality and the hydroxyl content) molecular weight of 400 to 10000, preferably 1000 to 5000, and which may contain up to 2.0 wt. %, preferably up to 1.6 wt. % and particularly preferably up to 1.2 wt. %, of carboxyl groups (calculated as COOH; molecular weight=45).

Suitable binders are, for example, hydroxyl group-containing polyesters, polyacrylates or polyurethanes, such as are described by way of example as powder lacquer binders in EP-A 0 045 998 or in EP-A 0 254 152, which may also be used in an arbitrary mixture with one another.

Preferably the polyol component A) is a polyester of the known type containing hydroxyl groups or arbitrary mixtures of such polyester polyols. These polyester polyols may be amorphous and have softening points (Tg) which, determined by differential thermal analysis (DTA), lie within the temperature range from 40° to 120° C., particularly preferably within the temperature range from 45° to 110° C., or may also be semi-crystalline and have melting points (according to DTA) in the range from 40° to 130° C., particularly preferably in the range from 50° to 100° C.

Amorphous polyester polyols preferably used as polyol component A) are, for example, those that are described by way of example in WO 91/07452 on page 8, lines 3 to 29. Preferably used semi-crystalline polyester polyols are also known and are described for example in WO 91/07452 on page 8, line 30 to page 11, line 25 or in WO 2005/105879 on page 11, lines 6 to page 12, line 7.

In the powder lacquers according to the invention the hydroxyfunctional binders A) are combined with a cross-linking agent component B) reactive to hydroxyl groups. These are polyaddition compounds present in solid form below 40° C. and in liquid form above 125° C. and comprising uretdione groups and optionally free isocyanate groups, preferably compounds based on aliphatic and/or cycloaliphatic diisocyanates, in particular those based on 1,6-hexamethylene diisocyanate (HDI), 1-isocyanato-3,3,5-trimethyl-5-isocyanatomethylcyclohexane (diisophorone diisocyanate, IPDI), 4,4'- and/or 4,2'-diisocyanatodicyclohexylmethane, 1,3-diisocyanato-2(4)-methylcyclohexane or mixtures of these diisocyanates.

The production of such polyaddition compounds by reacting polyisocyanates containing uretdione groups with difunctional and optionally monofunctional compounds reactive to isocyanate groups, in particular dihydric and optionally monohydric alcohols, is described for example in DE-A 2 420 475, EP-A 045 996, EP-A 0 045 998, EP-A 0 639 598, EP-A 0 669 353, EP-A 1 024 158 or WO 04/005363. The polyaddition compounds containing uretdione groups and possibly free isocyanate groups and suitable as component B) generally have a content of uretdione groups (calculated as $C_2N_2O_2$, molecular weight=84) of 3 to 19 wt. % and a content of free isocyanate groups (calculated as NCO; molecular weight=42) of 0 to 6.0 wt. %. The melting point and melting point range of these compounds is generally within the temperature range from 40° to 125° C.

Polyaddition compounds containing uretdione groups and particularly preferred as component B) are those that have a minimum content of carboxylic acid ester groups (calculated as $CO_2$; molecular weight=44) and/or carbonate groups (calculated as $CO_3$; molecular weight=60) of 1 wt. %. These particularly preferred polyaddition compounds containing uretdione groups are likewise already known, and may be produced as described for example in EP-A 0 639 598, EP-A 1 024 158, EP-B 1 063 251 or WO 04/005363.

The powder lacquers according to the invention contain as component C) monoalcohols or monoalcohol mixtures that are present in solid form below 23° C. and in liquid form above 125° C.

These monoalcohols are saturated or unsaturated monohydric alcohols which carry aliphatically, cycloaliphatically or aromatically bound hydroxyl groups and may optionally contain up to three heteroatoms from the group oxygen, sulphur, nitrogen. Suitable components C) are for example monoalcohols in the molecular weight range from 100 to 900, such as 1-dodecanol, 1-tridecanol, 1-tetradecanol, 1-pentadecanol, 1-hexadecanol, 1-heptadecanol, 1-octadecanol, (E)-9-octadecen-1-ol, 1-nonadecanol, 1-eicosanol, 1-heneicosanol, 1-docosanol, (E)- and (Z)-13-docosen-1-ol, 1-tricosanol, 1-tetracosanol, 1-pentacosanol, 1-hexacosanol, 1-heptacosanol, 1-octacosanol, 1-nonacosanol, 1-triacontanol, 1-hentriacontanol, 1-dotriacontanol, 1-tetratriacontanol, 2-tetradecyl-octadecanol, 2-hexadecyl-eicosanol, cyclohexanol, 1-methylcyclohexanol-(1), the isomeric decalols, cyclopentadecanol, 4-octylphenol, 4-tert.-octylphenol, isomeric nonylphenols, 1-naphthol, 2-naphthol or mixtures of such alcohols.

Also suitable as component C) are homologue mixtures of linear or branched monoalcohols with number average molecular weights of 200 to 750, such as occur, for example, as primary products in known processes in technical syntheses, so long as these have a melting point range or softening range in the aforementioned temperature range. A comprehensive overview of suitable technical processes for producing such monoalcohol mixtures is given for example in *"Fatty Alcohols", Ullmann's Encyclopedia of Industrial Chemistry, Electronic Release, 7$^{th}$ ed. Wiley-VCH, Weinheim June 2001, DOI. 10.1002/14356007.a10_277*. Suitable homologous monoalcohol mixtures can be obtained, for example, by the Ziegler process (Alfol or Epal process), by hydroformylation of α-olefins, for example according to the SHOP process ("Shell's Higher Olefin Process"), or by various oxidative processes from paraffins, e.g. according to the Baker Petrolite process (see for example U.S. Pat. No. 4,426,329).

Preferred components C) are saturated linear or branched aliphatic monoalcohols with 12 to 50 carbon atoms, mixtures of such monoalcohols, or homologue mixtures of saturated linear or branched monoalcohols produced by one of the aforementioned processes, which contain on average 18 to 50 carbon atoms.

Particularly preferred are saturated linear aliphatic monoalcohols with 12 to 24 carbon atoms and primary bound hydroxyl groups, mixtures of such primary monoalcohols, or homologue mixtures of saturated primary monoalcohols produced by one of the aforementioned processes, which have on average 23 to 50 carbon atoms.

The components A), B) and C) are used in the powder lacquer according to the invention in such amounts that 0.8 to 2.2, preferably 1.0 to 2.0, particularly preferably 1.2 to 1.8 isocyanate groups of the component B) are available for each hydroxyl group of the components A) and C), and the proportion of the component C) in the total amount of the components A) to F) is 1 to 10 wt. %, preferably 2 to 8 wt. % and particularly preferably 3 to 7 wt. %.

In order to accelerate the curing the powder lacquers according to the invention contain at least one curing catalyst D) that accelerates the reaction of uretdione groups with hydroxyl groups.

The curing catalyst is, for example, inorganic or organic zinc compounds, such as e.g. zinc oxide, zinc sulphide, zinc carbonate, zinc fluoride, zinc chloride, zinc bromide, zinc iodide, zinc phosphate, zinc borate, zinc titanate, zinc hexafluorosilicate, zinc sulfite, zink sulfate, zinc nitrate, zinc tetrafluoroborate, zinc acetate, zinc octoate, zinc cyclohexanebutyrate, zinc laurate, zinc palmitate, zinc stearate, zinc behenate, zinc citrate, zinc gluconate, zinc acetylacetonate, zinc-2,2,6,6-tetramethyl-3,5-heptanedionate, zinc trifluoracetate, zinc trifluoromethanesulfonate and zinc dimethyldithiocarbamate, or mixtures of such compounds.

Also suitable as curing catalysts D) are ammonium or phosphonium salts containing carboxylate, hydroxide or fluoride anions, as well as metal hydroxides and metal alcoholates, such as are specifically described for example in WO 2005/105879 (page 8, line 14 to page 10, line 21).

Preferred catalysts D) are zinc compounds of the aforementioned type. The most particularly preferred catalyst D) is zinc acetylacetonate.

The curing catalysts D) may be used in the powder lacquers according to the invention in an amount of 0.05 to 5 wt. %, preferably 0.1 to 3 wt. %, referred to the total amount of the components A) to F).

The component E) optionally contained in the powder lacquers according to the invention are compounds containing groups reactive to carboxyl groups and having a molecular weight of 200 to 5000, preferably 200 to 2000, particularly preferably 250 to 1000, such as are generally used in powder lacquer technology as cross-linking agent components for powder lacquer binders containing carboxyl groups.

Suitable components E) are, for example, the polyepoxides known per se, such as triglycidyl isocyanurate (TGIC) and triglycidyl urazole or their oligomers, glycidyl ethers, such as those based on bisphenol A, glycidyl-functional copolymers, such as the known glycidyl methacrylates (GMA resins), but also glycidyl esters, such as those of phthalic acid, terephthalic acid, trimellitic acid, tetrahydrophthalic acid and hexahydrophthalic acid, or mixtures of such polyepoxides.

Suitable components E) are for example also compounds containing β-hydroxyalkylamide groups, such as are described in EP-A 0 322 834 as cross-linking agent components for polyesters containing carboxyl groups. The production of such β-hydroxyalkylamides is generally carried out by base-catalyzed reaction of organic polycarboxylic acid esters with β-hydroxyalkylamines at temperatures of up to 200° C., with the simultaneous distillative removal of the alcohol which is thereby formed.

Preferred compounds that may optionally be co-used as component E) in the powder lacquers according to the invention are terephthalic acid diglycidyl ester, trimellitic acid triglycidylester, TGIC or β-hydroxyalkylamides based on saturated dicarboxylic acid esters with 4 to 12 carbon atoms in the dicarboxylic acid part, or mixtures of these compounds. Particularly preferably the component E) consists of mixtures of 70 to 82 wt. % of terephthalic acid diglycidyl ester and 18 to 30 wt. % of trimelitic acid triglycidyl ester.

If the component E) is used at all in the powder lacquer according to the invention, then it is preferably used in such amounts that an at least equimolar amount of groups of the component E) that are reactive to carboxyl groups is available for each carboxyl group of the component A). Possibly, for example when using polyol components A) with a particularly low melt viscosity, the reaction with a molar substoichiometric amount of groups reactive to carboxyl groups may, however, already be sufficient to cancel the inhibitory action of the carboxyl groups, so that in the powder lacquers according to the invention the ratio of carboxyl groups to groups reactive to carboxyl groups may be from 0.8 to 2.0, preferably from 1.0 to 1.5 and particularly preferably from 1.0 to 1.3.

Optionally the powder lacquer according to the invention may contain further auxiliary substances and additives F) known from powder lacquer technology.

These further substances are for example conventional polyurethane catalysts, such as e.g. aluminum tri(ethylacetonate), tin(II) hexanoate, tin(II) n-octanoate, tin(II) 2-ethyl-1-hexanoate, tin(II) ethylcaproate, tin(II) laurate, tin(II) palmitate, dibutyltin(IV) oxide, dibutyltin(IV) dichloride, dibutyltin(IV) diacetate, dibutyltin(IV) dimaleate, dibutyl tin (IV) dilaurate, dioctyltin(IV) diacetate, molybdenum glycolate 1,5-diazabicyclo[4.3.0]non-5-ene or 1,8-diazabicyclo [5.4.0]-undec-7-ene, or arbitrary mixtures of such catalysts.

A further class of catalysts that may optionally be used in conjunction are the conventional compounds known from the literature which are capable of accelerating the reaction of carboxyl groups possibly present in the component A) with the groups of the component E) reactive to carboxyl groups, for example ammonium salts such as tetrabutylammonium chloride, bromide or iodide, tetraethylammonium chloride, bromide or iodite, trimethylbenzylammonium chloride, dodecyldimethyl-(2-phenoxyethyl)-ammonium bromide or diethyl-(2-hydroxyethyl)-methylammonium bromide, phosphonium salts such as tetrabutylphosphonium chloride, bromide or iodide, tetraethylphosphonium chloride, bromide or iodide, tetramethylphosphonium bromide, octadecyl-tributylphosphonium bromide, hexadecyltributylphosphonium bromide, catalysts with an imidazole structure, such as imidazole, 2-methylimidazole, 2-methyl-4-ethylimidazole, 2-[(N-benzylanilino)-methyl]-2-imidazoline phosphate or 2-benzyl-2-imidazoline hydrochloride, or tertiary amines such as N,N-dimethylcyclohexylamine, N,N-diethylcyclohexylamine, N-methylpiperidine, N-methylmorpholine, pentamethyldiethylene triamine, N,N'-dimethylpiperazine or 1,4-diazabicyclo[2,2,2]octane.

Preferred catalysts F) that may optionally be used in conjunction are ammonium and phosphonium salts of the aforementioned types.

If at all, these additional catalysts F) are used in an amount of up to 4 wt. %, preferably up to 2.4 wt. %, referred to the total amount of the components A) to F), with the proviso that the total amount of all catalysts D) and optionally F) contained in the powder lacquer is 0.05 to 5 wt. %, preferably 0.1 to 3 wt. %, the proportion of the zinc catalysts D) in this total amount of D) and F) being at least 20 wt. %.

Further auxiliary substances and additives F) that may optionally be used in conjunction are, for example, flow improvers, such as polybutyl acrylate or those based on polysilicones, light stability agents, such as sterically hindered amines, UV absorbers, such as benztriazoles or benzophenones, pigments, such as titanium dioxide, or also color stabilizers to protect against the danger of overstoving yellowing, such as trialkyl and/or triaryl phosphites optionally containing inert substituents, such as triethyl phosphite, triisodecyl phosphite, triphenyl phosphite or trisnonylphenyl phosphite.

To produce the finished powder lacquer the constituents A), B), C), D) and optionally E) and F) are intimately mixed with one another and are then combined in the melt to form a homogeneous material. This may be carried out in suitable equipment, for example heatable kneaders, but preferably by melt extrusion, the extrusion temperature generally being chosen so that the maximum shear forces act on the mixture. In order to avoid a premature cross-linking of the powder lacquer, an upper temperature limit of 110° C. should not be exceeded.

The sequence of the combination of the individual components A) to F) is largely freely selectable in this process.

One way that is similarly preferred within the context of the present invention for producing a finished powder lacquer is, in a first step, to mix intimately with one another only some of the individual components, for example only the components A), C) and D) or the components B) and D) or the components A), C), D) and E) in the melt, preferably during or directly following the production of the components A) or B), and add only at a later time, in a second step, the remaining components to the then resulting storage-stable homogenous material consisting of the components A), C) and D) or B) and D) or the components A), C), D) and E), and finally extrude all of them together. It is furthermore also possible to formulate arbitrary concentrates (master batches) of formulation constituents, for example those of the monoalcohols C) and/or of the catalysts D) and/or of the cross-linking agent components E) and/or further auxiliary substances and additives F) in part of the binder component A), and then add this in the powder lacquer production to the remaining components so as to form a powder lacquer according to the invention.

Regardless of the chosen process, the quantitative amounts of the individual components A), B), C), D), E) and F) are chosen so that, as already mentioned above, 0.8 to 2.2, preferably 1.0 to 2.0 and particularly preferably 1.2 to 1.8 isocyanate groups of the component B) are available for each hydroxyl group of the components A) and C), the expression isocyanate groups of the component B) being understood to denote the sum of isocyanate groups present in dimeric form as uretdione groups and free isocyanate groups, and 0.8 to 2.0, preferably 1.0 to 1.5 and particularly preferably 1.0 to 1.3 groups of the component E) reactive to carboxyl groups are available for each carboxyl group of the component A).

The extruded mass is, after cooling to room temperature and after a suitable pre-comminution, e.g. by chopping or crushing, ground to a powder lacquer, following which the mass is freed by screening from the grain fractions above the desired grain size, for example above 0.1 mm.

The powder lacquer formulations produced in this way may be applied by conventional powder application methods, such as electrostatic powder spraying or fluidized bed powder sintering, to the substrates to be coated. The coatings are hardened by heating to temperatures starting at 100° to 220° C., preferably however for polyurethane powder lacquers at low temperatures from 100° to 160° C., particularly preferably at temperatures from 120° to 150° C., for example over a period of ca. 5 to 60 minutes.

The cleavage-free PUR powder lacquers according to the invention, which contain monofunctional alcohols or mixtures of such alcohols as formulation constituents, produce already at stoving temperatures of 100° C. and above, hard, elastic coatings resistant to solvents and chemicals, which despite the low stoving temperature are characterized by outstanding optical properties, in particular a very good flow behavior, whereas analogous uretdione powder lacquers without addition of monoalcohol produce, under otherwise identical conditions, coatings exhibiting considerable flow disturbances and a marked surface structure.

The powder lacquers according to the invention enable the degree of gloss of a coating to be specifically adjusted in a very wide range. Depending on the nature and chain length of the monoalcohol component C) that is used, high-gloss to deep-matt surfaces can be obtained, which however at the same time are in all cases very smooth. Thus, the combined use of the preferred primary linear aliphatic monoalcohols with 12 to 24 carbon atoms leads, as a rule, to high-gloss coatings, while the use of higher molecular weight homologous mixtures of saturated primary monoalcohols, such as are marketed, for example, by the Baker-Pectrolite company under the trade mark Unilin® etc., produces matt lacquer films.

According to the invention heat-resistant substrates, such as those of metals, glass, wood or temperature-resistant plastics, can be coated.

The following examples serve to describe the invention in more detail.

EXAMPLES

All percentage figures, with the exception of the gloss values, refer to weight percent.
Starting Compounds
Polyol A)

Hydroxyl group-containing polyester produced from 47.3 parts by weight of terephthalic acid, 44.6 parts by weight of neopentyl glycol, 2.9 parts by weight of adipic acid and 5.2 parts by weight of trimellitic anhydride.

| OH No.: | 40 mg KOH/g |
| Acid No.: | 13 mg KOH/g |
| Carboxyl group content: | 1.04% |
| Melting point range (DTA): | 58° to 62° C. |

Polyaddition Compounds B) Containing Uretdione Groups (According to EP-A 0 639 598)
a) Production of a Diol Containing Ester Groups:

901 g of 1,4-butanediol and 1712 g of ε-caprolactone are mixed at room temperature under a nitrogen atmosphere, 0.3 g of tin(II) octoate is added, and the mixture is then heated for 5 hours at 160° C. After cooling the mixture to room temperature, a colorless, liquid product is obtained having the following characteristic data:

| Viscosity (23° C.): | 180 mPas |
| OH No: | 416 mg KOH/g |
| Free caprolactone: | 0.2% |
| Number average molecular weight: | 269 (calc. from OH No.) |
| Ester group content (calc.): | 25.3% | b) Production of Component B) Containing Uretdione Groups:

1000 g (4.05 val) of a uretdione group-containing polyisocyanate based on 1-isocyanato-3,3,5-trimethyl-5-isocyanatomethyl-cyclohexane (IPDI) with a content of free isocyanate groups of 17.0% and a content of uretdione groups (determined by hot titration) of 20.7% are heated under dry nitrogen to 80° C. A mixture of 436 g (3.24 val) of the diol from a) containing ester groups and 105 g (0.81 val) of 2-ethyl-1-hexanol is then added within 30 minutes and stirred at a reaction temperature of at most 105° C. until the NCO content of the reaction mixture has fallen after ca. 2 hours to a value of 0.4%. The melt is cooled by being poured onto a metal sheet and a practically colorless solid resin is obtained having the following characteristic data:

| NCO content: | 0.4% |
| Uretdione group content (calc.): | 13.4% |
| Total NCO content (calc.): | 13.8% |
| Monomeric IPDI: | 0.09% |
| Melting point: | 80° to 82° C. |

Monoalcohols C)

| C1) | Stearyl alcohol | (Molecular weight: 270, m.p.: 58° C.) |
| C2) | Tetradecanol | (Molecular weight: 214, m.p.: 39° C.) |
| C3) | Eicosanol | (Molecular weight: 298, m.p.: 65° C.) |
| C4) | Docosanol | (Molecular weight: 326, m.p.: 72° C.) |
| C5) | Unilin ® 425 * | (OH No.: 105, number average molecular weight: 460, m.p.: 91° C.) |
| C6) | Unilin ® 550 * | (OH No.: 83, number average molecular weight: 550, m.p.: 99° C.) |
| C7) | Unilin ® 700 * | (OH No: 65, number average molecular weight: 700, mp.: 106° C.) |

* synthetically produced homologue mixture of saturated linear aliphatic primary monoalcohols with primary bound OH groups, containing up to 20% of non-functional polyethylene chains. Commercial products obtainable from Baker Petrolite (Sugar Land, Texas)

Catalyst D) Zinc Acetylacetonate
Components E) Reactive to Carboxyl Groups

Araldit® PT 910, commercial product from Huntsman Advanced Materials (Basel, Switzerland):

Mixture of terephthalic acid diglycidyl ester (70 to 82%) and trimellitic acid triglycidylester (18 to 30%), epoxide equivalent 150 g/val epoxide group.

Example 1

According to the Invention and Comparison

| 41.7 parts by weight | of the hydroxyl group-containing polyester A) with a content of carboxyl groups of 1.0% were thoroughly mixed with |
| 17.3 parts by weight | of the polyaddition compound B), corresponding to an equivalent ratio of total NCO to OH of 1.5:1, |
| 2.2 parts by weight | of the monoalcohol C1) (stearyl alcohol) |
| 1.0 part by weight | catalyst D) (zinc acetylacetonate) |
| 2.0 parts by weight | of the component E) (Araldit ® PT 910), corresponding to an equivalent ratio of carboxyl groups to groups reactive to carboxyl groups of 1.4:1, as well as auxiliary substances and additives F) with |
| 1.0 part by weight | tetrabutylammonium bromide (further catalyst), |
| 1.5 part by weight | of a commercially available flow improver (Resiflow ® PV 88, Fa. Worlée-Chemie, Hamburg, Germany) |
| 0.3 part by weight | of benzoin and |
| 30.0 parts by weight | of a white pigment (Kronos ® 2160, Kronos Titan, Leverkusen, Germany) | and then homogenized with the aid of a Buss PLK 46 type co-kneader at 150 rpm and a housing temperature of 40° C. in the feed region as well as on the shaft, and of 80° C. in the processing section, stock temperatures of 95° to 100° C. being reached. The solidified melt was ground and screened with the aid of a ACM II classifier mill (Hosokawa Mikropul) with a 90 μm sieve.

The gel time (determined according to DIN 55 990, Part 8, Point 5.1) of this powder lacquer according to the invention was 106 seconds at 160° C.

For comparison a powder lacquer was produced in the same way from

| | |
|---|---|
| 43.2 parts by weight | of the polyester A), |
| 17.9 parts by weight | of the polyaddition compound B), |
| 1.0 part by weight | of the catalyst D) (zinc acetylacetonate), |
| 2.1 parts by weight | of the component E) (Araldit ® PT 910), |
| 1.0 part by weight | tetrabutylammonium bromide, |
| 1.5 parts by weight | of the flow improver Resiflow ® PV 88, |
| 0.3 parts by weight | benzoin and |
| 33.0 parts by weight | of the white pigment Kronos ® 2160 |

The equivalent ratio of total NCO to OH was, as in the powder lacquer according to the invention described hereinbefore, 1.5:1, the equivalent ratio of carboxyl groups to groups reactive to carboxyl groups was similarly 1.4:1. The gel time of this powder lacquer was 123 sec at 160° C.

The two powder lacquers thereby obtained were sprayed with a ESB beaker gun at a high voltage of 70 KV onto degreased steel sheets and hardened in each case for 15 minutes at a temperature of 140° C. and 10 minutes at 160° C. With layer thicknesses of about 60 μm the following lacquer technical properties were found:

| | Powder lacquer according to the invention | | Comparison | |
|---|---|---|---|---|
| Stoving conditions | 15 min/ 140° C. | 10 min/ 160° C. | 15 min/ 140° C. | 10 min/ 160° C. |
| Erichsen indentation [mm] [a] | 1 | 9 | 9 | 9 |
| Solvent resistance [b] | 50/0-1 | 50/0-1 | 50/0-1 | 50/0-1 |
| Gloss [c] (20°/60°) | 89/100 | 87/99 | 69/88 | 73/93 |

-continued

| | Powder lacquer according to the invention | | Comparison | |
|---|---|---|---|---|
| Stoving conditions | 15 min/ 140° C. | 10 min/ 160° C. | 15 min/ 140° C. | 10 min/ 160° C. |
| Visually assessed flow | Very good | Very good | Slight structure | Slight structure |

[a] according to DIN EN ISO 1520
[b] Number of double strokes with acetone-impregnated cotton swab/evaluation (0 = Film intact, 1 = Film surface softened, 2 = Film swollen down to the substrate, 3 = Film dissolved, m = matte, loss of gloss)
[c] according to DIN 67530; 20° and 60° angle of reflection The comparison shows that both powder lacquers produce at 160° C. completely cross-linked solvent-resistant films. The powder lacquer according to the invention, which contains in addition stearyl alcohol as binder constituent, forms a coating having a significantly improved flow behavior, as shown in particular by the 20° gloss values.

Examples 2-8

White pigmented powder lacquers were produced according to the process described in Example 1, starting from the raw materials described there and with the joint use of different monoalcohols C), and were sprayed with an ESB beaker gun at a high voltage of 70 KV onto degreased steel sheets. The lacquers were then in each case stoved for 10 minutes at 160° C. The following table shows the compositions (parts by weight) of the powder lacquers as well as the lacquer technical data of the coatings obtained therefrom (meaning of the footnotes [a-d]) and evaluation as in Example 1.

The Examples confirm that the powder lacquers according to the invention lead to coatings having a significantly improved flow behavior compared to the comparison powder lacquer from Example 1. The examples also show that, depending on the nature and amount of the employed monoalcohols C), the degree of gloss of the powder lacquers according to the invention can be specifically adjusted. Whereas the primary linear aliphatic monoalcohols C2)-C4) provide high-gloss lacquer films, the higher molecular weight homologue mixtures of saturated primary monoalcohols C5)-C7) lead to matte coatings, which however in all cases run very smoothly.

| Example | 2 | 3 | 4 | 5 | 6 | 7 | 8 |
|---|---|---|---|---|---|---|---|
| Polyester polyol A) | 40.8 | 37.9 | 34.4 | 37.7 | 32.6 | 32.8 | 33.8 |
| Uretdione cross-linking agent B) | 18.3 | 19.2 | 20.7 | 18.1 | 19.9 | 19.0 | 17.7 |
| Monoalcohol C2) | 2.4 | — | — | — | — | — | — |
| Monoalcohol C3) | — | 4.5 | — | — | — | — | — |
| Monoalcohol C4) | — | — | 6.7 | — | — | — | — |
| Monoalcohol C5) | — | — | — | 5.8 | 9.3 | — | — |
| Monoalcohol C6) | — | — | — | — | — | 10.0 | — |
| Monoalcohol C7) | — | — | — | — | — | — | 10.3 |
| Zinc acetylacetonate D) | 1.0 | 1.0 | 1.0 | 1.0 | 1.0 | 1.0 | 1.0 |
| Araldite PT 910 E) | 1.7 | 1.6 | 1.4 | 1.6 | 1.4 | 1.4 | 1.4 |
| Tetrabutylammonium bromide | 1.0 | 1.0 | 1.0 | 1.0 | 1.0 | 1.0 | 1.0 |
| Resiflow ® PV 88 | 1.5 | 1.5 | 1.5 | 1.5 | 1.5 | 1.5 | 1.5 |
| Benzoin | 0.3 | 0.3 | 0.3 | 0.3 | 0.3 | 0.3 | 0.3 |
| Kronos ® 2160 | 33.0 | 33.0 | 33.0 | 33.0 | 33.0 | 33.0 | 33.0 |

-continued

| Example | 2 | 3 | 4 | 5 | 6 | 7 | 8 |
|---|---|---|---|---|---|---|---|
| Equivalent ratio NCO:OH | 1.5 | 1.5 | 1.5 | 1.5 | 1.5 | 1.5 | 1.5 |
| Equivalent ratio COOH:epoxide | 1.2 | 1.2 | 1.2 | 1.2 | 1.2 | 1.2 | 1.2 |
| Erichsen indentation [mm] [a] | 9.0 | 8.0 | 7.0 | 8.9 | 6.4 | 5.5 | 5.5 |
| Gloss [c] (20°/60°) | 79/95 | 85/97 | 82/97 | 24/62 | 3/12 | 2/15 | 6/25 |
| Visual flow | very good | very good | very good | very good | very good | very good | very good |
| Solvent resistance [d] | 50/0-1 | 50/0-1 | 50/0-1 | 50/0-1 | 50/0-1 | 50/0-1 | 50/0-0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyurethane powder lacquer, containing
    A) a binder component comprising one or more hydroxy-functional compounds present in solid form below 40° C. and in liquid form above 130° C., with an OH number of 15 to 200 mg KOH/g, a number average molecular weight of 40 to 10,000 and a total content of carboxyl groups (calculated as COOH; molecular weight=45) of up to 2.0 wt. %,
    B) one or more polyaddition compounds comprising uretdione groups and optionally free isocyanate groups and based on aliphatic and/or cycloaliphatic diisocyanates, wherein the one or more polyaddition compounds has a minimum content of carboxylic acid ester groups (calculated as $CO_2$; molecular weight=44) and/or carbonate groups (calculated as $CO_3$; molecular weight=60) of 1 wt. %,
    C) one or more monoalcohols present in solid form below 23° C. and in liquid form above 125° C.,
    D) one or more curing catalysts suitable for accelerating the reaction of uretdione groups with hydroxyl groups,
    E) optionally a component comprising one or more compounds with a number average molecular weight of 200 to 5000 and having groups reactive to carboxyl groups, and
    F) optionally auxiliary substances and additives known from powder lacquer technology,
    wherein the components A), B) and C) are present in such quantitative amounts that 0.8 to 2.2 isocyanate groups of the component B) are available for each hydroxyl group of the components A) and C), the components A) and optionally E) are present in such quantitative amounts that 0.8 to 2.0 groups of the component E) that are reactive to carboxyl groups are available for each carboxyl group of the component A), the proportion of the component C) in the total amount of the components A) to F) is from 1 to 10 wt. %, and the proportion of the component D) in the total amount of the components A) to F) is 0.05 to 5 wt. %.

2. Powder lacquer according to claim 1, wherein component A) comprises a hydroxyl group-containing polyester with an OH number of 25 to 200 and with a number average molecular weight of 1000 to 5000.

3. Powder lacquer according to claim 2, wherein the hydroxyl group-containing polyester of the component A) is an amorphous polyester with a softening point (Tg) within the temperature range from 40° to 120° C. and/or is a semi-crystalline polyester with a melting point in the range from 40° to 130° C.

4. Powder lacquer according to claim 1, wherein component B) comprises a polyaddition compound containing uretdione groups and optionally free isocyanate groups and based on a diisocyanate selected from the group consisting of hexamethylene diisocyanate, isophorone diisocyanate, 4,4'- and 4,2'-diisocyanatodicyclohexylmethane, 1,3-diisocyanato-2(4)-methylcyclohexane and mixtures thereof.

5. Powder lacquer according to claim 1, wherein component C) comprises a saturated linear or branched aliphatic monoalcohol with 12 to 50 carbon atoms, a mixture of such monoalcohols or a homologue mixture of saturated linear or branched monoalcohols that have on average 18 to 50 carbon atoms.

6. Powder lacquer according to claim 1, wherein component C) comprises one or more saturated linear aliphatic monoalcohol with 12 to 24 carbon atoms and primary bound hydroxyl groups.

7. Powder lacquer according to claim 1, wherein component C) comprises a homologue mixture of saturated linear monoalcohols which contain on average 23 to 50 carbon atoms and carry primary bound hydroxyl groups.

8. Powder lacquer according to claim 1, wherein at least one inorganic or organic zinc compound is used as the curing catalyst D).

9. Powder lacquer according to claim 8, wherein zinc acetyl acetonate is used as the curing catalyst D).

10. Powder lacquer according to claim 1, wherein at least one ammonium or phosphonium salt with carboxylate, hydroxide or fluoride anions is used as the curing catalyst D).

11. Powder lacquer according to claim 1, wherein at least one metal alcoholate with an up to hexavalent metal cation is used as the curing catalyst D).

12. Powder lacquer according to claim 1, wherein polyepoxides and/or β-hydroxyalkylamides are used as component E).

13. Powder lacquer according to claim 1, wherein mixtures of 70 to 82 wt. % terephthalic acid diglycidyl ester and 18 to 30 wt. % of trimellitic acid triglycidyl ester are used as component E).

14. Powder lacquer according to claim 1, wherein tetraalkylammonium and/or tetraalkylphosphonium salts are used in component F).

15. Powder lacquer according to claim 1, wherein components A), B) and C) are present in quantitative amounts such that 1.0 to 2.0 isocyanate groups of the component B) are available for each hydroxyl group of the components A), and C), the components A) and optionally E) are present in quantitative amounts such that 1.0 to 1.5 groups of the component E) reactive to carboxyl groups are available for each carboxyl group of the component A), and the proportion of the component C) in the total amount of the components A) and C) is from 2 to 7 wt. % and the proportion of the component D) in the total amount of the components A) to E) is 0.1 to 3 wt. %.

16. A method of coating a substrate comprising providing a substrate and coating the substrate with the powder lacquer according to claim 1.

17. Substrates coated with polymer films obtained from powder lacquers according to claim 1.

* * * * *